US010424342B2

(12) United States Patent
Brown et al.

(10) Patent No.: US 10,424,342 B2
(45) Date of Patent: Sep. 24, 2019

(54) FACILITATING PEOPLE SEARCH IN VIDEO SURVEILLANCE

(75) Inventors: Lisa M. Brown, Pleasantville, NY (US); Rogerio S. Feris, White Plains, NY (US); Arun Hampapur, Norwalk, CT (US); Daniel A. Vaquero, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 12/845,116

(22) Filed: Jul. 28, 2010

(65) Prior Publication Data

US 2012/0030208 A1 Feb. 2, 2012

(51) Int. Cl.
G06K 9/00 (2006.01)
G06T 7/292 (2017.01)
G11B 27/10 (2006.01)
G11B 27/34 (2006.01)
G06F 16/783 (2019.01)

(52) U.S. Cl.
CPC .......... G11B 27/105 (2013.01); G06F 16/784 (2019.01); G06K 9/00771 (2013.01); G06T 7/292 (2017.01); G11B 27/34 (2013.01); *G06T 2207/20081* (2013.01); *G06T 2207/30196* (2013.01); *G06T 2207/30232* (2013.01)

(58) Field of Classification Search
USPC ....... 707/673, 679, 681, 688, 691, 696, 706, 707/711, 713, 715, 722, 723, 732, 739, 707/741–746, 748–756, 781, 805, 80
See application file for complete search history.

(56) References Cited

U.S. PATENT DOCUMENTS

| | | |
|---|---|---|
| 5,870,138 A | 2/1999 | Smith et al. |
| 6,549,913 B1 | 4/2003 | Murakawa |
| 6,608,930 B1 | 8/2003 | Agnihotri et al. |
| 6,795,567 B1 | 9/2004 | Cham et al. |
| 6,829,384 B2 | 12/2004 | Schneiderman |
| 6,885,761 B2 | 4/2005 | Kage |

(Continued)

FOREIGN PATENT DOCUMENTS

| | | |
|---|---|---|
| CN | 101201822 A | 6/2008 |
| DE | 19960372 A1 | 6/2001 |

(Continued)

OTHER PUBLICATIONS

Example-Based Object detection in Images by Components, (IEEE Transactions on Pattern Analysis and Machine Intelligence, vol. 23, No. 4, Apr. 2001).*

(Continued)

*Primary Examiner* — Charles D Adams
(74) *Attorney, Agent, or Firm* — Ryan, Mason & Lewis, LLP

(57) ABSTRACT

Techniques for facilitating a video surveillance search of a person are provided. The techniques include maintaining a database of one or more attributes of one or more people captured on one or more video cameras, indexing the one or more attributes in the database extracted from the one or more video cameras, and pruning one or more images captured from the one or more video cameras using the one or more attributes and one or more items of qualifying information to facilitate a video surveillance search of a person.

20 Claims, 5 Drawing Sheets

(56) References Cited

U.S. PATENT DOCUMENTS

| | | | |
|---|---|---|---|
| 6,920,236 | B2 | 7/2005 | Prokoski |
| 6,967,674 | B1 | 11/2005 | Lausch |
| 6,973,201 | B1 | 12/2005 | Colmenarez et al. |
| 7,006,950 | B1 | 2/2006 | Greiffenhagen et al. |
| 7,257,569 | B2 | 8/2007 | Elder et al. |
| 7,274,803 | B1 | 9/2007 | Sharma et al. |
| 7,277,891 | B2 | 10/2007 | Howard et al. |
| 7,355,627 | B2 | 4/2008 | Yamazaki |
| 7,382,894 | B2 | 6/2008 | Ikeda et al. |
| 7,391,900 | B2 | 6/2008 | Kim et al. |
| 7,395,316 | B2 | 7/2008 | Ostertag et al. |
| 7,406,184 | B2 | 7/2008 | Wolff et al. |
| 7,450,735 | B1 | 11/2008 | Shah |
| 7,460,149 | B1 | 12/2008 | Donovan et al. |
| 7,526,102 | B2 | 4/2009 | Ozer |
| 7,711,145 | B2* | 5/2010 | Gallagher .......... G06F 17/30265 345/473 |
| 7,764,808 | B2 | 7/2010 | Zhu |
| 7,822,227 | B2 | 10/2010 | Barnes et al. |
| 7,929,771 | B2 | 4/2011 | Bo |
| 7,974,714 | B2 | 7/2011 | Hoffberg |
| 8,004,394 | B2 | 8/2011 | Englander |
| 8,208,694 | B2 | 6/2012 | Jelonek et al. |
| 8,254,647 | B1 | 8/2012 | Nechyba |
| 8,401,333 | B2 | 3/2013 | Miyakawa |
| 8,411,908 | B2 | 4/2013 | Ebata et al. |
| 8,421,872 | B2 | 4/2013 | Neven, Sr. |
| 8,532,390 | B2 | 9/2013 | Brown et al. |
| 8,588,533 | B2 | 11/2013 | Brown |
| 2003/0120656 | A1 | 6/2003 | Kageyama et al. |
| 2004/0210661 | A1* | 10/2004 | Thompson ............ G06Q 30/02 709/228 |
| 2005/0013482 | A1 | 1/2005 | Niesen |
| 2005/0162515 | A1 | 7/2005 | Venetianer et al. |
| 2006/0165386 | A1 | 7/2006 | Garoutte |
| 2006/0184553 | A1 | 8/2006 | Liu et al. |
| 2006/0285723 | A1 | 12/2006 | Morellas et al. |
| 2007/0052858 | A1 | 3/2007 | Zhou et al. |
| 2007/0053513 | A1* | 3/2007 | Hoffberg ...................... 380/201 |
| 2007/0122005 | A1 | 5/2007 | Kage et al. |
| 2007/0126868 | A1 | 6/2007 | Kiyohara et al. |
| 2007/0177819 | A1 | 8/2007 | Ma et al. |
| 2007/0183763 | A1 | 8/2007 | Barnes et al. |
| 2007/0237355 | A1 | 10/2007 | Song et al. |
| 2007/0237357 | A1 | 10/2007 | Low |
| 2007/0254307 | A1 | 11/2007 | Kita |
| 2007/0294207 | A1* | 12/2007 | Brown et al. ...................... 707/1 |
| 2008/0002892 | A1 | 1/2008 | Jelonek et al. |
| 2008/0080743 | A1 | 4/2008 | Schneiderman et al. |
| 2008/0109397 | A1 | 5/2008 | Sharma |
| 2008/0122597 | A1 | 5/2008 | Englander |
| 2008/0123968 | A1 | 5/2008 | Nevatia et al. |
| 2008/0159352 | A1 | 7/2008 | Adhikari et al. |
| 2008/0201282 | A1 | 8/2008 | Garcia et al. |
| 2008/0211915 | A1 | 9/2008 | McCubbrey |
| 2008/0218603 | A1 | 9/2008 | Oishi |
| 2008/0232651 | A1 | 9/2008 | Woo |
| 2008/0252722 | A1 | 10/2008 | Wang et al. |
| 2008/0252727 | A1 | 10/2008 | Brown et al. |
| 2008/0269958 | A1 | 10/2008 | Filev et al. |
| 2008/0273088 | A1 | 11/2008 | Shu et al. |
| 2008/0317298 | A1 | 12/2008 | Shah et al. |
| 2009/0046153 | A1 | 2/2009 | Chen et al. |
| 2009/0060294 | A1 | 3/2009 | Matsubara et al. |
| 2009/0066790 | A1 | 3/2009 | Hammadou |
| 2009/0074261 | A1 | 3/2009 | Haupt et al. |
| 2009/0097739 | A1 | 4/2009 | Rao et al. |
| 2009/0174526 | A1 | 7/2009 | Howard et al. |
| 2009/0261979 | A1 | 10/2009 | Breed et al. |
| 2009/0295919 | A1 | 12/2009 | Chen et al. |
| 2010/0026802 | A1* | 2/2010 | Titus .............. G08B 13/19608 348/143 |
| 2010/0039506 | A1 | 2/2010 | Sarvestani et al. |
| 2010/0106707 | A1* | 4/2010 | Brown ................ G06K 9/6254 707/711 |
| 2010/0150447 | A1 | 6/2010 | GunasekaranBabu et al. |
| 2011/0082874 | A1* | 4/2011 | Gainsboro ........ G06F 17/30398 707/769 |
| 2011/0087677 | A1 | 4/2011 | Yoshio et al. |
| 2012/0027304 | A1 | 2/2012 | Brown |
| 2012/0039506 | A1 | 2/2012 | Sturzel et al. |

FOREIGN PATENT DOCUMENTS

| | | |
|---|---|---|
| EP | 1260934 A2 | 11/2002 |
| FR | 2875629 A1 | 3/2006 |
| JP | H0863597 A | 3/1996 |
| JP | H10222678 A | 8/1998 |
| JP | 2004070514 A | 3/2004 |
| JP | 2005078376 A | 3/2005 |
| JP | 2009252118 A | 10/2009 |
| TW | 201006527 A | 2/2010 |
| TW | 201020935 A | 6/2010 |
| TW | M381850 U | 6/2010 |
| WO | WO 2009117607 A1 | 9/2009 |
| WO | 2009133667 A1 | 11/2009 |
| WO | 2010023213 A1 | 3/2010 |

OTHER PUBLICATIONS

Attribute-Based People Search in Surveillance Environments, Daniel A. Vaquero . . . Duan Tran . . . Matthew turk, Dec. 2009, Total 9 pages, (pages numbered as 1-9), http://ieeexplore.ieee.org/stamp/stamp.jsp?tp=&arnumber=5403131.*
U.S. Appl. No. 12/845,095, filed Jul. 28, 2010, titled, Semantic Parsing of Objects in Video.
International Search Report for PCT/EP2011/062910 dated Oct. 6, 2011.
Indexing and Searching According to Attributes of a Person, pp. 1-35.
Jiang et al. View synthesis from Infrared-visual fused 3D model for face recognition, Fifth Intl. Conference on Information, Communications and Signal Processing, pp. 177-180, 2005.
Gundimada et al. Feature Selection for Improved Face Recognition in Multisensor Images. In R. Hammoud, B. Abidi and M. Abidi, editors. Face Biometrics for Personal Identification, Signals and Communication Technology, pp. 109-120, Springer Berlin Heidelberg, 2007.
Tian et al. Real-time Detection of Abandoned and Removed Objects in Complex Environments.
Viola et al. Rapid Object Detection using a Boosted Cascade of Simple Features. 2001.
Viola and Jones. Robust Real-Time Object Detection. 2001.
Conaire et al. Multispectral Object Segmentation and Retrieval in Surveillance Video.
Tseng et al. Mining from time series human movement data. 2006.
Raskar et al. Image Fusion for Context Enhancement and Video Surrealism. 2004.
Abidi et al. Survey and Analysis of Multimodal Sensor Planning and Integration for Wide Area Surveillance. 2008.
Kong et al. Recent advances in visual and infrared face recognition—a review. 2005.
Wu et al, Fast Rotation Invariant Multi-View Face Detection Based on Real Adaboost.
Boyle et al. The Language of Privacy: Learning from Video Media Space Analysis and Design.
Milian. Virtual Interviews.
Fukuda et al. Visual Surveillance System with Multiple Cameras in Wide Area Environment.
Petrushin et al. Multiple Sensor Integration for Indoor Surveillance.
Trease et al. Unstructured data analysis of streaming video using parallel, high-throughput algorithms.
Hampapur et al. Multi-scale Tracking for Smart Video Surveillance. IEEE Transactions on Signal Processing, vol. 22, No. 2, Mar. 2005.
Kang et al.; Continuous Tracking within and Across Camera Streams.
Dalal et al., "Histograms of Oriented Gradients for Human Detection", CVPR 2005, San Diego, USA.

(56) References Cited

OTHER PUBLICATIONS

Comaniciu et al., "Real-Time Tracking of Non-Rigid Objects Using Mean Shift", CVPR 2000, Hilton Head, SC, USA.
U.S. Appl. No. 12/845,119, filed Jul. 28, 2010, titled, Attribute Based Person Tracking Across Multiple Cameras.
U.S. Appl. No. 12/845,121, filed Jul. 28, 2010, titled, Multispectral Detection of Personal Attributes for Video Surveillance.
Mittal et al, M2Tracker: A Multi-View Approach to Segmenting and Tracking People in a Cluttered Scene, International Journal of Computer Vision, vol. 51, Issue 3, pp. 189-203, Feb. 2003.
Park et al., Simultaneous Tracking of Multiple Body Parts of Interacting Persons, Computer Vision and Image Understanding, vol. 102, Issue 1, pp. 1-21, 2006.
Chibelushi et al., Facial Expression Recognition: A Brief Tutorial Overview, pp. 1-5, 2002.
Feris et al, Detection and Tracking of Facial Features in Video Sequences, Lecture Notes in Computer Science, vol. 1793, Proceedings of the Mexican International Conference on Artificial Intelligence (pp. 127-135).
Xu et al., Pedestrian Detection with Local Feature Assistant, Control and Automation, 2007, ICCA 2007, IEEE International Conference on May 30-Jun. 1, 2007, pp. 1542-1547, 2007.
Mohan et al., Example-Based Object Detection in Images by Components, IEEE Transaction of Pattern Analysis and Machine Intelligence, vol. 23, No. 4, pp. 349-361, Apr. 2001.
Felzenszwalb et al., Pictorial Structures for Object Recognition, International Journal of Computer Vision (IJCV), pp. 1-42, Jan. 2005.
Ramanan et al., Strike a Pose: Tracking People by Finding Stylized Poses, Computer Vision and Pattern Recognition (CVPR), San Diego, CA, Jun. 2005.
Tran et al., Configuration Estimates Improve Pedestrian Finding, National Information Processing Systems Foundation, 2007.
Tsochantaridis et al., Large Margin Methods for Structured and Interdependent Output Variables, Journal of Machine Learning Research (JMLR), Sep. 2005.
Naive Bayes Classifier, Wikipedia, http://en.wikipedia.org/wiki/Naive_Bayes_classifier, Jul. 27, 2010, 7 pages.
KaewTrakuPong et al., A Real Time Adaptive Visual Surveillance System for Tracking Low-Resolution Colour Targets in Dynamically Changing Scenes, Image and Vision Computing, vol. 21, Issue 1-0, pp. 913-929, 2003.
Schmidt, Automatic Initialization for Body Tracking Human Upper Body Motions, 3rd International Conference on Computer Vision Theory and Applications (VISAPP), Jan. 22, 2008.
Bi et al., Human Body Segmentation Based on Adaptive Feature Selection in Complex Situations, pp. 1-9.
Lao et al., Fast Detection and Modeling of Human-Body Parts from Monocular Video, F.J. Perales and R.B. Fisher (Eds.): AMDO 2008, LNCS 5098, pp. 380-389, 2008.
Samangooei et al., The Use of Semantic Human Description as a Soft Biometric, Biometrics: Theory, Applications and Systems, 2008. BTAS 2008. 2nd IEEE International Conference, Apr. 22, 2013.
Park et al., Multiresolution Models for Object Detection, in Proceedings of the 11th European Conference on Computer Vision: Part IV, pp. 241-254 (2010).
Ronfard et al., Learning to Parse Pictures of People, Lecture Notes in Computer Science—LNCS, vol. 2353, Jan. 1, 2002, pp. 700-714.
Li-Jia Li et al., Towards Total Scene Understanding: Classification, Annotation and Segmentation in an Automatic Framework, Computer Vision and Pattern Recognition, 2009, CVPR 2009. IEEE, Piscataway, NJ, USA, Jun. 20, 2009, pp. 2036-2043.
Szelisky, Computer Vision: Algorithms and Applications, Jan. 1, 2011, Springer, pp. 615-621.
Marr, Vision, Jan. 1, 1982, Freeman, pp. 305-313.
Ramanan, Part-Based Models for Finding People and Estimating Their Pose, in: Thomas B. Moeslund et al., Visual Analysis of Humans, Jan. 1, 2011, Springer, pp. 1-25.
Zhu et al., A Stochastic Grammar of Images, Jan. 1, 2007, Now Publishers, pp. 259-362.
Vaquero et al., Chapter 14: Attribute-Based People Search, in: Yunqian Ma et al. Intelligent Video Surveillance: Systems and Technology, Jan. 1, 2009, pp. 387-405.
Feris, Chapter 3, Case Study: IBM Smart Surveillance System, in: Yunqian Ma et al., Intelligent Video Surveillance: System and Technology, Jan. 1, 2009, pp. 47-76.
Nowozin et al., Structured Learning and Prediction in Computer Vision, Jan. 1, 2011, Now Publishers, pp. 183-365.
Wu, Integration and Goal-Guided Scheduling of Bottom-up and Top-Down Computing Processes in Hierarchical Models, UCLA Jan. 1, 2011.
Lin L et al., A Stochastic Graph Grammar for Compositional Object Representation and Recognition, Pattern Recognition, Elsevier, GB, vol. 42, No. 7, Jul. 1, 2009, pp. 1297-1307.
Yang et al., Evaluating Information Contributions of Bottom-up and Top-down Processes, Computer Vision, 2009 IEEE, Piscataway, NJ, USA, Sep. 29, 2009, pp. 1042-1049.
Tan et al., Enhanced Pictorial Structures for Precise Eye Localization Under Incontrolled Conditions, Computer Vision and Pattern Recognition, 2009. CVPR 2009. IEEE, Piscataway, NJ, USA Jun. 20, 2009, pp. 1621-1628.
Ioffe et al., Probabilistic Methods for Finding People, International Journal of Computer Vision, Kluwer Academic Publishers, Norwell, US, vol. 43, No. 1, Jun. 1, 2001, pp. 45-68.
Ronfard et al. Learning to Parse Pictures of People, Jan. 1, 2002, pp. 1-15.
Yokokawa et al., Face Detection with the Union of Hardware and Software, Technical Report of IEICE, The Institute of Electronics, Information and Communication Engineers, Jan. 10, 2007.

\* cited by examiner

FACILITATING PEOPLE SEARCH IN VIDEO SURVEILLANCE

CROSS-REFERENCE TO RELATED APPLICATIONS

The present application is related to U.S. patent application entitled "Multispectral Detection of Personal Attributes for Video Surveillance," identified by U.S. Pat. No. 12/845,121 and filed concurrently herewith, the disclosure of which is incorporated by reference herein in its entirety.

Additionally, the present application is related to U.S. patent application entitled "Attribute-Based Person Tracking Across Multiple Cameras," identified by U.S. Pat. No. 12/845,119, and filed concurrently herewith, the disclosure of which is incorporated by reference herein in its entirety.

Also, the present application is related to U.S. patent application entitled "Semantic Parsing of Objects in Video," identified by U.S. Pat. No. 12/845,095, and filed concurrently herewith, the disclosure of which is incorporated by reference herein in its entirety.

FIELD OF THE INVENTION

Embodiments of the invention generally relate to information technology, and, more particularly, to video surveillance.

BACKGROUND OF THE INVENTION

It can be challenging to find or locate a specific person or suspect from a large number of video surveillance cameras over any specified or extended time period. Existing approaches include manually searching through videos. However, even when individual people can be extracted from each camera's view, the user would need to consider each person in each camera over the time period to find the matching person. Such approaches are prohibitively time consuming, and search criteria are not always accurately known or executed.

SUMMARY OF THE INVENTION

Principles and embodiments of the invention provide techniques for facilitating people search in video surveillance. An exemplary method (which may be computer-implemented) for facilitating a video surveillance search of a person, according to one aspect of the invention, can include steps of maintaining a database of one or more attributes of one or more people captured on one or more video cameras, indexing the one or more attributes in the database extracted from the one or more video cameras, and pruning one or more images captured from the one or more video cameras using the one or more attributes and one or more items of qualifying information to facilitate a video surveillance search of a person.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
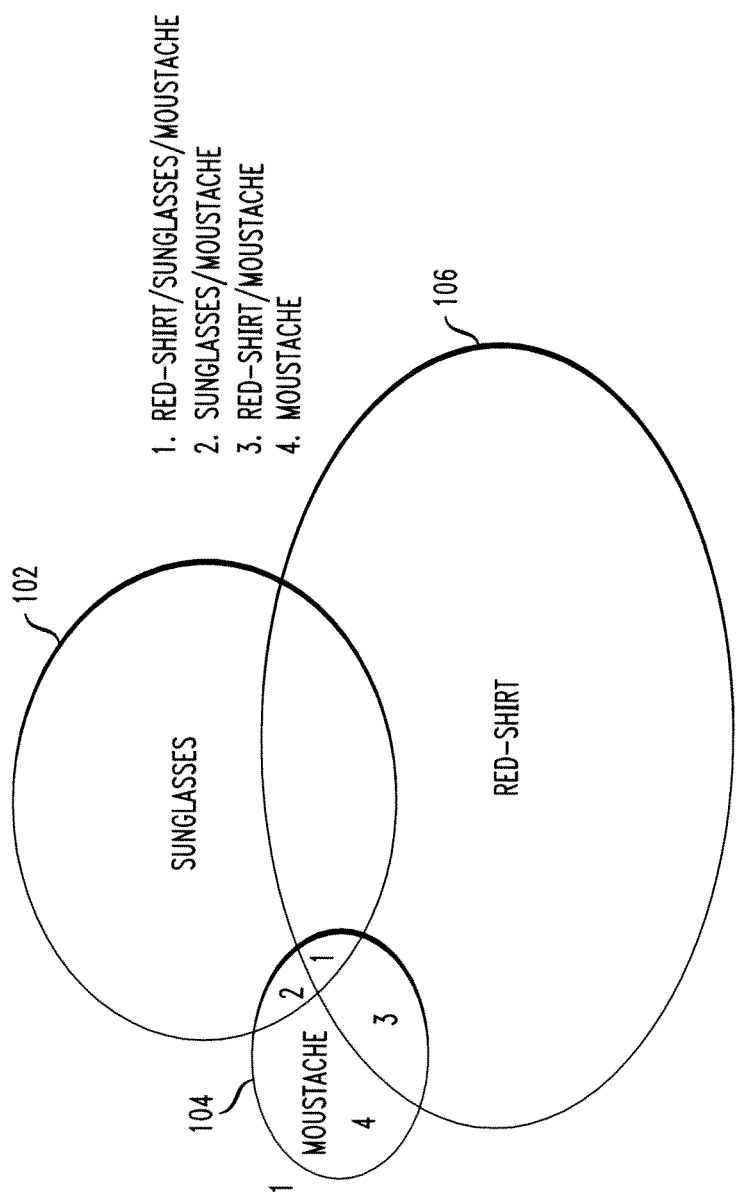
FIG. 1 is a diagram illustrating multidimensional feature space, according to an embodiment of the present invention.

Principles of the invention include facilitating people search in video surveillance. One or more embodiments of the invention include using flexible indexing in a database of people attributes extracted from video surveillance cameras, and intelligently pruning this space using person attributes, their associated accuracy in finding a specific person and their association with information provided by the user.

Additionally, one or more embodiments of the invention can include a user interface in which the user supplies information about the person at multiple levels (for example, multiple scales such as how tall a person is, what clothes the person is wearing, facial characteristics, etc.). This information, combined with information about the distributions of attributes extracted and their utility in finding the person are used to deliver to the user the set of most likely candidates. If the person is not found, one or more embodiments of the invention can include iterating the process until a satisfactory match is found or the database is exhausted.

As such, and as detailed herein, one or more embodiments of the invention include facilitating finding or locating a specific person (or suspect, missing person, etc.) from a number of video surveillance cameras over any specified or extended time period. As described further herein, one or more embodiments of the invention include the use of metrics for attribute accuracy, search-space culling, and correlation with other metrics, as well as multi-tier pruning with a user guiding the search. Rather than providing the user with all of the possible people who fit a description, culling, as used herein, refers to first giving the user the most likely fits (based, for example, on how accurate the measurements are, how likely to be useful the elements are, how discerning the elements are, etc.).

Also, as noted above, one or more embodiments of the invention include multi-tier pruning. With multi-tiered pruning, one or more embodiments of the invention can provide the user search results, and based on the feedback (for example, whether the individual in question or someone similar was found or not), the next set of results can be re-computed.

Statistics of a specific features space are used, based on the data stored for people seen in a given time range and the specific cameras in the pertinent location with respect to the known information about the location of the person/suspect. The space is pruned intelligently based on the time the person was last seen, going in what direction and at what speed (probability depends on distance from original camera, time depends on distance and original time, direction of entry into camera depends on the direction the person was going, etc.).

One or more embodiments of the invention can include using sensors and/or multispectral attribute detectors to carry out the people search. By way of example only, example sensors and/or detectors can be found in Hampapur et al. Multi-scale Tracking for Smart Video Surveillance, IEEE Transactions on Signal Processing, Vol. 22, No. 2, March 2005.

Pictures and/or key-frames of people that are most likely to be the person-in-question/suspect are returned first, based on which features have better culling ability. FIG. 1 is a diagram illustrating multidimensional feature space, according to an embodiment of the present invention. By way of illustration, FIG. 1 depicts a sunglasses attribute detection region 102, a mustache attribute detection region 104 and a red-shirt attribute detection region 106. As further depicted in FIG. 1, portion "1" of the detection regions indicates presence of a red-shirt, sunglasses and a mustache. Portion "2" of the detection regions indicates presence of sunglasses and a mustache. Further, portion "3" of the detection regions indicates presence of a red-shirt and a mustache, while portion "4" of the detection regions indicates presence of a mustache. In one or more embodiments of the invention, the regions are based on their culling ability, which is computed in an optimization module based on the three inputs (see, for example, component 410 in FIG. 4).

As illustrated by FIG. 1, each feature can an attribute that can be detected about a person such as, for example, shirt/pants color, sunglasses, eyeglasses, facial hair (beard, mustache), hat, skin color, eye color, carrying a bag, walking alone, etc. Each person seen in a camera is recorded in the database with their detected attributes. Also, in one or more embodiments of the invention, an interface displays people with attributes in the order of their likelihood and culling ability.

Figure 2:
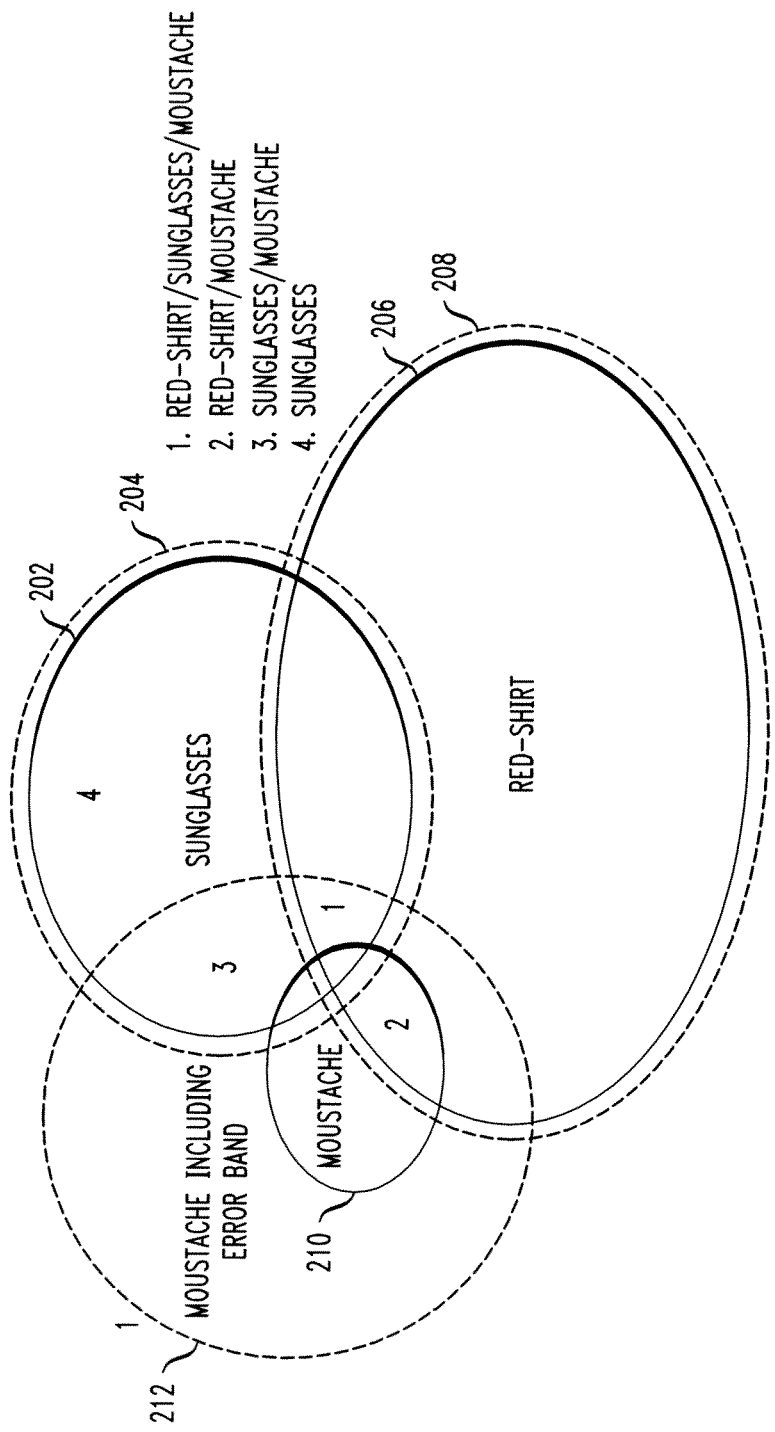
FIG. 2 is a diagram illustrating attribute inaccuracy, according to an embodiment of the present invention.

Further, one or more embodiments of the invention include qualifying information with its predicted accuracy because, for example, in this domain it is often difficult to detect an attribute accurately and this depends on each attribute. FIG. 2 is a diagram illustrating attribute inaccuracy, according to an embodiment of the present invention. By way of illustration, FIG. 2 depicts a sunglasses attribute detection region 202, a mustache attribute detection region 210 and a red-shirt attribute detection region 206. The dashed regions, that is, region 204, region 208 and region 212, include error in attribute detection in relation to other attributes. For example, detecting a mustache may be more difficult if the person is wearing sunglasses.

For example, it might be easier for the system to detect a red shirt than to detect beards (which are often confused by faces looking down since they have shadows). One or more embodiments of the invention can also consider correlations between attributes. For example, if a red-shirt is detected, it is unlikely it is a black shirt, but it is more likely it is an orange shirt.

As further depicted in FIG. 2, portion "1" of the detection regions indicates presence of a red-shirt, sunglasses and a mustache. Portion "2" of the detection regions indicates presence of a red-shirt and a mustache. Further, portion "3" of the detection regions indicates presence of a sunglasses and a mustache, while portion "4" of the detection regions indicates presence of sunglasses.

If the person-of-interest/suspect is not found, one or more embodiments of the invention can include giving the user more possible candidates. In one or more embodiments of the invention, the possible candidates are given in order of their likelihood based on their joint probabilities, taking into account the possibility that the user's description was inaccurate (for example, person took off sunglasses, looked like they had a beard, etc.).

Figure 3:
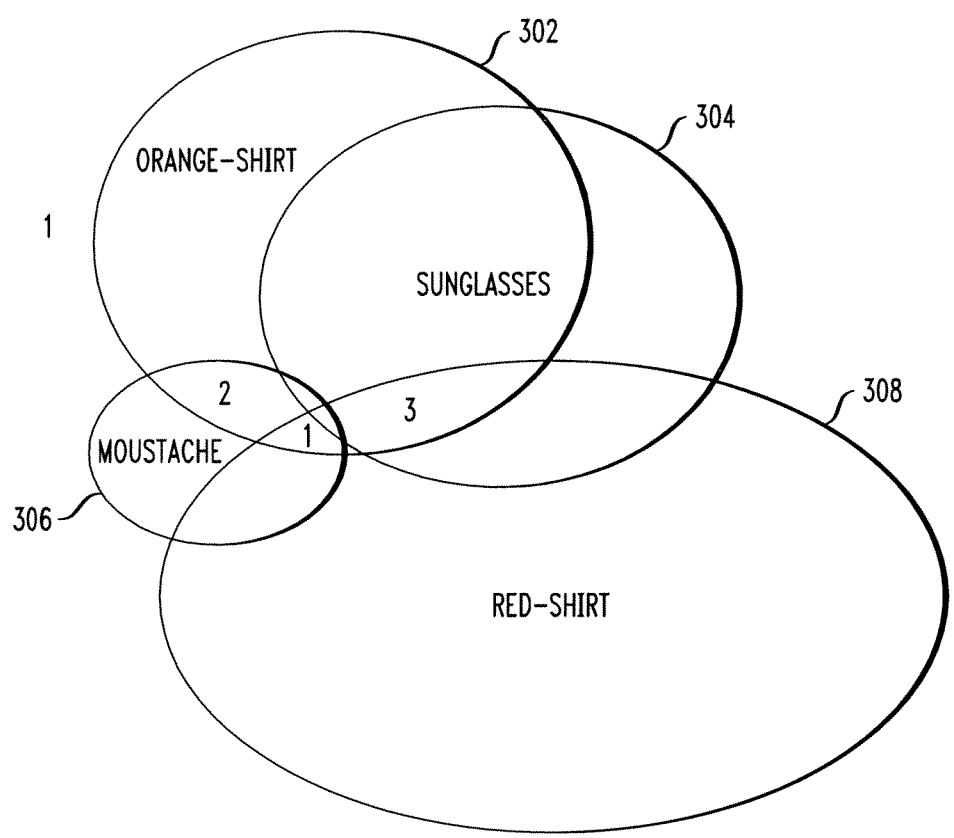
FIG. 3 is a diagram illustrating a suspect not found scenario, according to an embodiment of the present invention.

FIG. 3 is a diagram illustrating a suspect not found scenario, according to an embodiment of the present invention. By way of illustration, FIG. 3 depicts an orange-shirt attribute detection region 302, a sunglasses attribute detection region 304, a mustache attribute detection region 306 and a red-shirt attribute detection region 308. As further depicted in FIG. 3, portion "1" of the detection regions indicates presence of a red-shirt, an orange shirt and a mustache. Portion "2" of the detection regions indicates presence of an orange shirt and a mustache. Further, portion "3" of the detection regions indicates presence of a red-shirt, an orange shirt and sunglasses.

As detailed herein, one or more embodiments of the invention can include using an interface to display people with attributes in the order of their likelihood, greatest culling ability, and correlation with related attributes. For a person-of-interest/suspect not found, one or more embodiments of the invention can include, by way of example, broadening the search, reviewing and/or modifying the description and detection, and finding the most likely feature set based on correlation between attributes and their error distributions. If the person is found, the search can be repeated to find the person in the next location, for example, based on more accurate description (from results) and updated position, direction of movement, etc.

Figure 4:
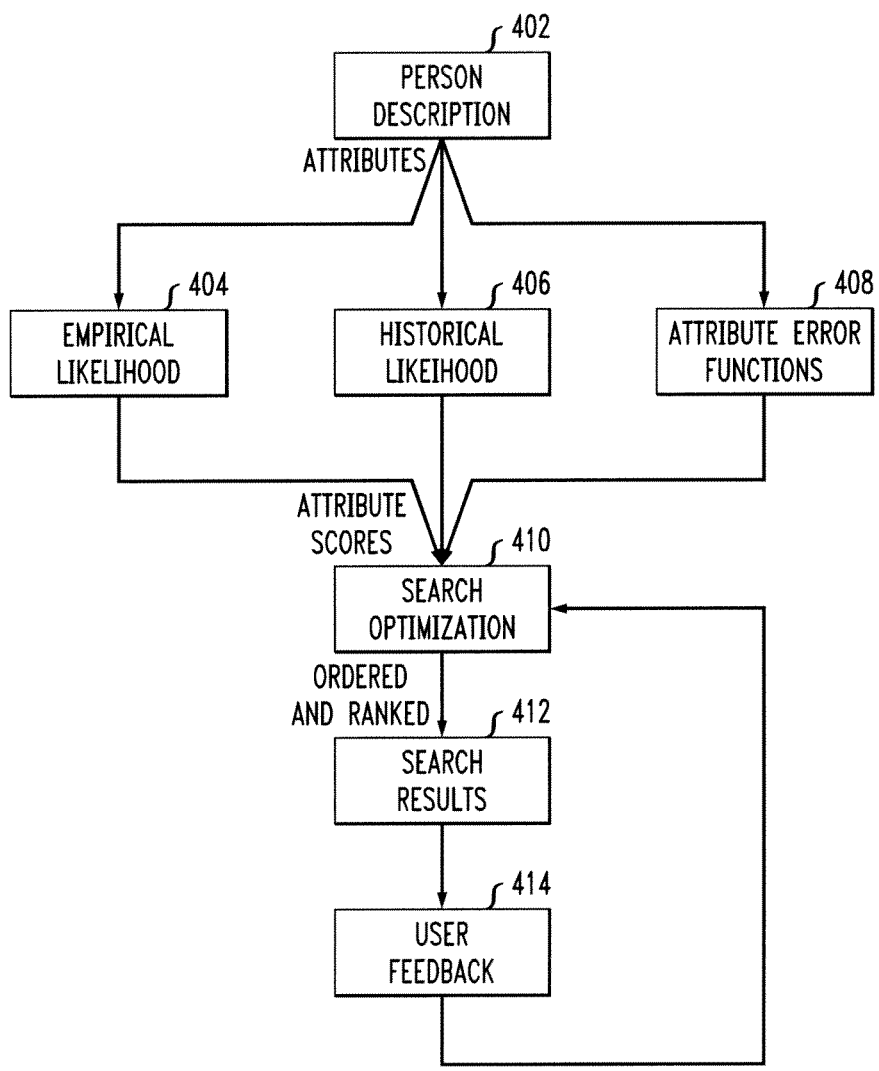
FIG. 4 is a block diagram illustrating an exemplary embodiment, to according to an aspect of the invention.

FIG. 4 is a block diagram illustrating an exemplary embodiment, according to an aspect of the invention. By way of illustration, FIG. 4 depicts a person descriptor module 402, an empirical likelihood module 404, a historical likelihood module 406, an attribute error function module 408, a search optimization module 410, a search results module 412 and a user feedback module 414.

A person description module 402 receives input from a user which will result in list of attributes such as wearing sun glasses, blue shirt, beard, etc. The person descriptor module 402 will send the list of attributes to the empirical likelihood module 404, the historical likelihood module 406, and the attribute error function module 408. The empirical likelihood module 404, given a set of cameras to be searched and the time period, identifies the number of people with each of the attributes and the confidence with which this attribute was measured. The empirical likelihood is based on the absolute and relative distribution and correlation of the attributes in the database. The historical likelihood module 406, given a set of human attributes, calculates the statistics with which these attributes (and their correlations) are found in the general population. By way of example, one or more embodiments of the invention can consider the mean, median and standard deviation (or a non-parametric distribution) of the general population to compute the likelihood of a sample with a given set of attributes.

The attribute error function module 408, for each attribute, determines the error with which it is measured given the other attributes measured and the empirical and historical likelihood. The module determines whether the attribute is present using computer vision recognition technology such as a learning algorithm trained with examples of the attributes. In one or more embodiments of the invention, the confidence level is based on recognition measurement. For example, if the attribute to be measured is "moustache," the system is trained with examples of people with moustaches. However, in training, it is determined that dark areas around the lips due to shadowing often cause false recognition rates. The accuracy of the recognition is lower, particularly for the case where there is little other evidence besides darkness over the lip.

The empirical likelihood module 404, the historical likelihood module 406, and the attribute error function module 408 send attribute scores to the search optimization module 410. All scores are sent and used in the optimization.

The search optimization module 410 maximizes the culling ability to provide the user the results which are most likely to be the candidate and to assist in the search. As detailed herein, the search optimization module 410 returns the subset of people who are most likely to be the person of interest. In one or more embodiments of the invention, the results are displayed (for example, via an interface in rank order of likeliness) so that the user can determine if the likely suspect is found. The search results module 412 produces results, which can, for example, come in batches (for example, ordered and ranked batches). In one or more embodiments of the invention, the first set of search results is the result of the first optimization. These can include, as described herein, the most likely to be the candidate or to assist in the search. As such, one or more embodiments of the invention include using different criteria (that is, empirical, historical, attribute error) followed by optimization to facilitate a people search. Additionally, the user feedback module 414 receives input from the user as to whether the results are helpful or not and forwards that input back to the search optimization module 410.

Figure 5:
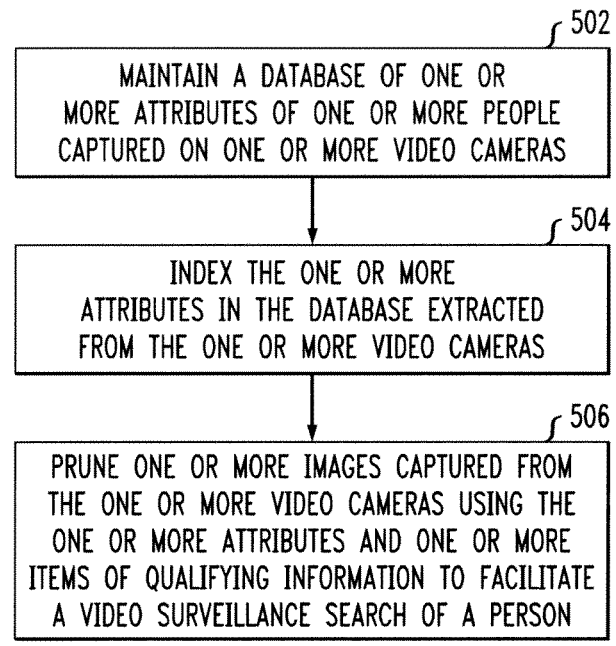
FIG. 5 is a flow diagram illustrating techniques for facilitating a video surveillance search of a person, according to an embodiment of the invention.

FIG. 5 is a flow diagram illustrating techniques for facilitating a video surveillance search of a person, according to an embodiment of the present invention. Step 502 includes maintaining a database of one or more attributes of one or more people captured on one or more video cameras. This step can be carried out, for example, using a person descriptor module. Maintaining a database can include recording each person seen in a camera in the database with each of one or more detected attributes of the person.

By way of example and not limitation, attributes can include clothing type, shirt color, pants color, presence of sunglasses, presence of eyeglasses, presence of a beard, presence of a mustache, presence of a hat, nose type, sideburns, clothes type, skin color, eye color, presence of a carried bag, absence or presence of a companion, etc.

Step 504 includes indexing (using, for example, flexible indexing) the one or more attributes in the database extracted from the one or more video cameras. This step can be carried out, for example, using a search optimization module. Indexing can include, for example, ranking and ordering performed by an optimization module, wherein the ranking is based on optimization results that return a likelihood assessment for each person in the database.

Step 506 includes pruning one or more images captured from the one or more video cameras using the one or more attributes and one or more items of qualifying information to facilitate a video surveillance search of a person. This step can be carried out, for example, in one or more embodiments of the invention, by reducing the search results by eliminating the results which are less useful. Pruning can include, for example, culling (or reducing) the images captured from the video cameras to a subset. Also, qualifying information can include, for example, empirical information, historical information, error information, a detection accuracy level associated with each attribute, information provided by a user associated with an attribute, a correlation between two or more attributes, etc.

The techniques depicted in FIG. 5 can also include using a user interface to enable a user to supply information about the person, as well as sending (for example, via the interface) a user a set of one or more candidates in the search for the person. The set of candidates can be sent to the user in order of their likelihood based on joint probabilities for each candidate. Also, one or more images of candidates that are most likely can be sent to the user prior to a balance of the set of candidates.

One or more embodiments of the invention can additionally include iterating the process of pruning images captured from the video cameras using the one or more attributes and items of qualifying information to facilitate a video surveillance search of a person if the person is not found until a satisfactory match is found or the database is exhausted. Further, one or more embodiments of the invention can include modifying attribute description and detection, and finding a most likely feature set based on correlation between one or more attributes and corresponding error distributions if the person is not found.

The techniques depicted in FIG. 5 can also include repeating the process of pruning images captured from the video cameras using the one or more attributes and items of qualifying information to facilitate a video surveillance search of a person in a second image captured by the video cameras if the person is found in one image captured by the video cameras. Additionally, one or more embodiments of the invention include using an updated description (updated position, direction of movement, etc.) of the person based on results from the one image captured by the video cameras.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a person descriptor module, an empirical likelihood module, a historical likelihood module, an attribute error functions module, a search optimization module a search results module and a user feedback module that can run, for example on one or more hardware processors.

The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
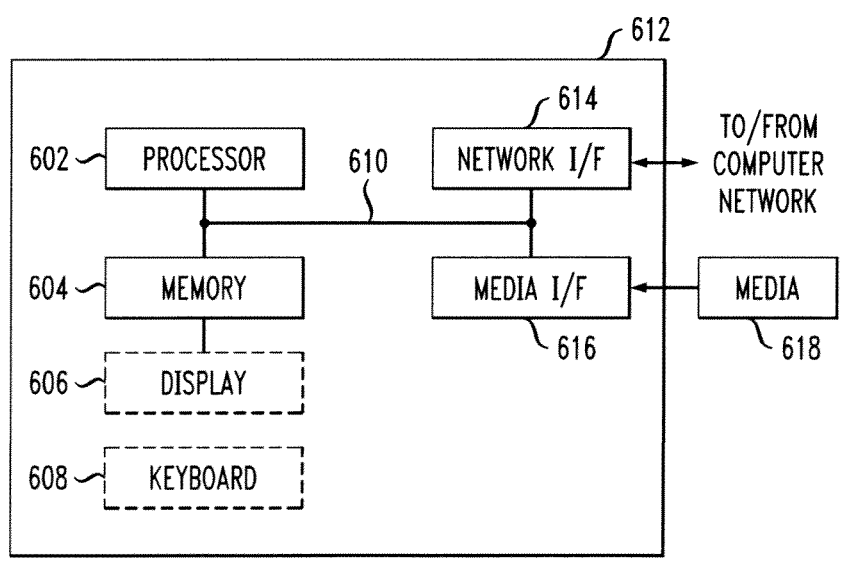
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 4. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, intelligently pruning a people attributes database using person attributes and their associated accuracy in finding a specific person.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for facilitating a video surveillance search of a person, wherein the method comprises:

maintaining a database of attributes of one or more people captured on one or more video cameras, wherein the attributes comprise clothing type, shirt color, pants color presence of sunglasses, presence of eyeglasses, presence of a beard, presence of a mustache, presence of a hat, nose type, sideburns, clothes type, skin color, eye color, presence of a carried bag, and absence or presence of a companion;

indexing the attributes in the database extracted from the one or more video cameras;

pruning one or more images captured from the one or more video cameras using the attributes and one or more items of qualifying information to facilitate a video surveillance search of a specific person, wherein the qualifying information includes (i) information, provided by a user requesting the search, about a particular attribute of the specific person sought in the video surveillance search, (ii) a utility level associated with the particular attribute for identifying a person in a video surveillance search, and (iii) an estimated error value for attribute detection accuracy of the particular attribute in relation to other attributes, and wherein said pruning comprises:

identifying a number of people with the particular attribute captured by the one or more video cameras over a pre-determined period of time to determine an empirical likelihood for identifying the sought person based on distribution of the particular attribute;

pruning the identified number of people with the particular attribute captured by the one or more cameras over the pre-determined period of time to determine an updated empirical likelihood for identifying the sought person, wherein said pruning the identified number of people comprises pruning the images based on the time the sought person was last seen, the direction in which the sought person was travelling, and the speed at which the sought person was travelling;

determining an historical likelihood of the particular attribute being found in the general population; and determining an accuracy with which the particular attribute is recognized given the utility level associated with the particular attribute and the determined updated empirical likelihood and the determined historical likelihood; and outputting, to at least one user, a result for the video surveillance search of the person based on said pruning of the one or more images captured from the one or more video cameras.

2. The method of claim 1, wherein indexing comprises ranking and ordering performed by an optimization module, wherein the ranking is based on optimization results that return a likelihood assessment for each person in the database.

3. The method of claim 1, wherein pruning comprises culling the one or more images captured from the one or more video cameras to a subset.

4. The method of claim 1, wherein maintaining a database comprises recording each person seen in a camera in the database with each of one or more detected attributes of the person.

5. The method of claim 1, wherein one or more items of qualifying information comprise at least one of empirical information and historical information.

6. The method of claim 1, wherein one or more items of qualifying information comprise a correlation between two or more attributes.

7. The method of claim 1, further comprising using a user interface to enable a user to supply information about the person.

8. The method of claim 1, further comprising sending a user a set of one or more candidates in the search for the person, wherein the set of one or more candidates are sent to the user in order of their likelihood based on joint probabilities for each candidate.

9. The method of claim 1, further comprising iterating the process of pruning one or more images captured from the one or more video cameras using the attributes and one or more items of qualifying information to facilitate a video surveillance search of a person if the person is not found until a satisfactory match is found or the database is exhausted.

10. The method of claim 1, further comprising modifying attribute description and detection, and finding a most likely feature set based on correlation between one or more attributes and corresponding error distributions if the person is not found.

11. The method of claim 1, further comprising repeating the process of pruning one or more images captured from the one or more video cameras using the attributes and one or more items of qualifying information to facilitate a video surveillance search of a person in a second image captured by the one or more video cameras if the person is found in one image captured by the one or more video cameras.

12. The method of claim 11, further comprising using an updated description of the person based on results from the one image captured by the one or more video cameras.

13. A computer program product comprising a tangible non-transitory computer readable recordable storage medium including computer useable program code for facilitating a video surveillance search of a person, the computer program product including:

computer useable program code for maintaining a database of attributes of one or more people captured on one or more video cameras, wherein the attributes comprise clothing type, shirt color, pants color, presence of sunglasses, presence of eyeglasses, presence of a beard, presence of a mustache, presence of a hat, nose type, sideburns, clothes type, skin color, eye color, presence of a carried bag, and absence or presence of a companion;

computer useable program code for indexing the attributes in the database extracted from the one or more video cameras;

computer useable program code for pruning one or more images captured from the one or more video cameras using the attributes and one or more items of qualifying information to facilitate a video surveillance search of a specific person, wherein the qualifying information includes (i) information, provided by a user requesting the search, about a particular attribute of the specific person sought in the video surveillance search, (ii) a utility level associated with the particular attribute for identifying a person in a video surveillance search, and (iii) an estimated error value for attribute detection accuracy of the particular attribute in relation to other attributes, and wherein said pruning comprises:
identifying a number of people with the particular attribute captured by the one or more video cameras over a pre-determined period of time to determine an empirical likelihood for identifying the sought person based on distribution of the particular attribute;
pruning the identified number of people with the particular attribute captured by the one or more cameras over the pre-determined period of time to determine an updated empirical likelihood for identifying the sought person, wherein said pruning the identified number of people comprises pruning the images based on the time the sought person was last seen, the direction in which the sought person was travelling, and the speed at which the sought person was travelling;
determining an historical likelihood of the particular attribute being found in the general population; and
determining an accuracy with which the particular attribute is recognized given the utility level associated with the particular attribute and the determined updated empirical likelihood and the determined historical likelihood; and
computer useable program code for outputting, to at least one user, a result for the video surveillance search of the person based on said pruning of the one or more images captured from the one or more video cameras.

14. The computer program product of claim 13, wherein one or more items of qualifying information comprise at least one of empirical information, historical information, and a correlation between two or more attributes.

15. The computer program product of claim 13, further comprising:
computer useable program code for using a user interface to enable a user to supply information about the person; and
computer useable program code for sending a user a set of one or more candidates in the search for the person, wherein the set of one or more candidates are sent to the user in order of their likelihood based on joint probabilities for each candidate.

16. The computer program product of claim 13, further comprising computer useable program code for modifying attribute description and detection, and finding a most likely feature set based on correlation between one or more attributes and corresponding error distributions if the person is not found.

17. A system for facilitating a video surveillance search of a person, comprising:
a memory; and
at least one processor coupled to the memory and operative to:
maintain a database of attributes of one or more people captured on one or more video cameras, wherein the attributes comprise clothing type, shirt color, pants color, presence of sunglasses, presence of eyeglasses, presence of a beard, presence of a mustache, presence of a hat, nose type, sideburns, clothes type, skin color, eye color, presence of a carried bag, and absence or presence of a companion;
index the attributes in the database extracted from the one or more video cameras;
prune one or more images captured from the one or more video cameras using the attributes and one or more items of qualifying information to facilitate a video surveillance search of a specific person, wherein the qualifying information includes (i) information, provided by a user requesting the search, about a particular attribute of the specific person sought in the video surveillance search, (ii) a utility level associated with the particular attribute for identifying a person in a video surveillance search, and (iii) an estimated error value for attribute detection accuracy of the particular attribute in relation to other attributes, and wherein said pruning comprises:
identifying a number of people with the particular attribute captured by the one or more video cameras over a pre-determined period of time to determine an empirical likelihood for identifying the sought person based on distribution of the particular attribute;
pruning the identified number of people with the particular attribute captured by the one or more cameras over the pre-determined period of time to determine an updated empirical likelihood for identifying the sought person, wherein said pruning the identified number of people comprises pruning the images based on the time the sought person was last seen, the direction in which the sought person was travelling, and the speed at which the sought person was travelling;
determining an historical likelihood of the particular attribute being found in the general population; and
determining an accuracy with which the particular attribute is recognized given the utility level associated with the particular attribute and the determined updated empirical likelihood and the determined historical likelihood; and
output, to at least one user, a result for the video surveillance search of the person based on said pruning of the one or more images captured from the one or more video cameras.

18. The system of claim 17, wherein one or more items of qualifying information comprise at least one of empirical information, historical information, and a correlation between two or more attributes.

19. The system of claim 17, wherein the at least one processor coupled to the memory is further operative to:
use a user interface to enable a user to supply information about the person; and
send a user a set of one or more candidates in the search for the person, wherein the set of one or more candidates are sent to the user in order of their likelihood based on joint probabilities for each candidate.

20. The system of claim 17, wherein the at least one processor coupled to the memory is further operative to modifying attribute description and detection, and finding a most likely feature set based on correlation between one or more attributes and corresponding error distributions if the person is not found.

* * * * *